US008549362B2

(12) United States Patent
Hirohata et al.

(10) Patent No.: US 8,549,362 B2
(45) Date of Patent: *Oct. 1, 2013

(54) MEMORY DEVICE

(75) Inventors: Kenji Hirohata, Tokyo (JP); Minoru Yonezawa, Tokyo (JP); Chie Morita, Kunitachi (JP); Takeichiro Nishikawa, Yokohama (JP); Minoru Nakatsugawa, Yokohama (JP); Minoru Mukai, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,370

(22) Filed: Sep. 14, 2012

(65) Prior Publication Data
US 2013/0013964 A1 Jan. 10, 2013

Related U.S. Application Data

(63) Continuation of application No. 12/748,807, filed on Mar. 29, 2010, now Pat. No. 8,296,608.

(30) Foreign Application Priority Data

Mar. 30, 2009 (JP) ................................. 2009-083345

(51) Int. Cl.
G06F 11/00 (2006.01)
(52) U.S. Cl.
USPC .......... 714/47.1; 714/4.2; 714/6.22; 714/704; 714/723; 714/718; 714/25; 365/227; 709/224; 711/114; 711/103

(58) Field of Classification Search
None
See application file for complete search history.

(56) References Cited

U.S. PATENT DOCUMENTS 7,251,691 B2 * 7/2007 Boyd et al. .................... 709/224
7,653,510 B2   1/2010 Hirohata et al.

(Continued)

FOREIGN PATENT DOCUMENTS

JP 2006-277370 A 10/2006
JP 2008-139927 A  6/2008

(Continued)

OTHER PUBLICATIONS

Lawrie, D.H.; "Access and Alignment of Data in an Array Processor", Computers, IEEE Transactions on, vol. C-24, No. 12, pp. 1145-1155, Dec. 1975.

(Continued)

*Primary Examiner* — John Trimmings
(74) *Attorney, Agent, or Firm* — Ohlandt, Greeley, Ruggiero & Perle, L.L.P.

(57) ABSTRACT

A first module calculates a failure occurrence risk index of each data storage area address. A second module calculates a power saving index of each data storage area address. A third module calculates an access speed index per unit data volume necessary to access each data storage area address. A fourth module generates a distribution table that represents the failure occurrence risk index, the power saving index, and the access speed index for each candidate address, with respect to data to be distributed. A fifth module selects a candidate address in the distribution table such that the power saving index and the access speed index meet restricting conditions and the failure occurrence risk index is minimized, and distributes the data to the candidate address.

3 Claims, 6 Drawing Sheets

(56) References Cited

U.S. PATENT DOCUMENTS

| | | | |
|---|---|---|---|
| 8,069,297 B2* | 11/2011 | Nishihara | 711/103 |
| 8,189,412 B2 | 5/2012 | Mukai et al. | |
| 2005/0228943 A1* | 10/2005 | DeCenzo et al. | 711/114 |
| 2006/0168398 A1* | 7/2006 | Cadaret | 711/114 |
| 2008/0126836 A1* | 5/2008 | DiZoglio et al. | 714/4 |
| 2010/0070204 A1 | 3/2010 | Monda et al. | |
| 2010/0250149 A1 | 9/2010 | Omori et al. | |
| 2011/0197023 A1* | 8/2011 | Iwamitsu et al. | 711/114 |
| 2011/0239013 A1* | 9/2011 | Muller | 713/320 |

FOREIGN PATENT DOCUMENTS

| | | | |
|---|---|---|---|
| JP | 2008-241432 A | 10/2008 | |
| WO | PCT/JP2010/00084 | 1/2010 | |
| WO | WO2010084706 A1 | 7/2010 | |

OTHER PUBLICATIONS

Jen-Wei Hsieh, Tei-Wei Kuo, and Li-Pin Chang; "Efficient identification of hot data for flash memory storage systems"; Trans. Storage 2, Feb. 1, 2006; pp. 22-40.

Japanese Office Action dated May 24, 2011 from corresponding JP 2009-083345.

Hirohata, Kenji; "Reliability Design of Electronics Packaging for High-Performance Digital Equipment"; Toshiba Review, Kabushiki Kaisha Toshiba, May 1, 2005, vol. 60, No. 5, pp. 6-9 (with English Abstract).

\* cited by examiner

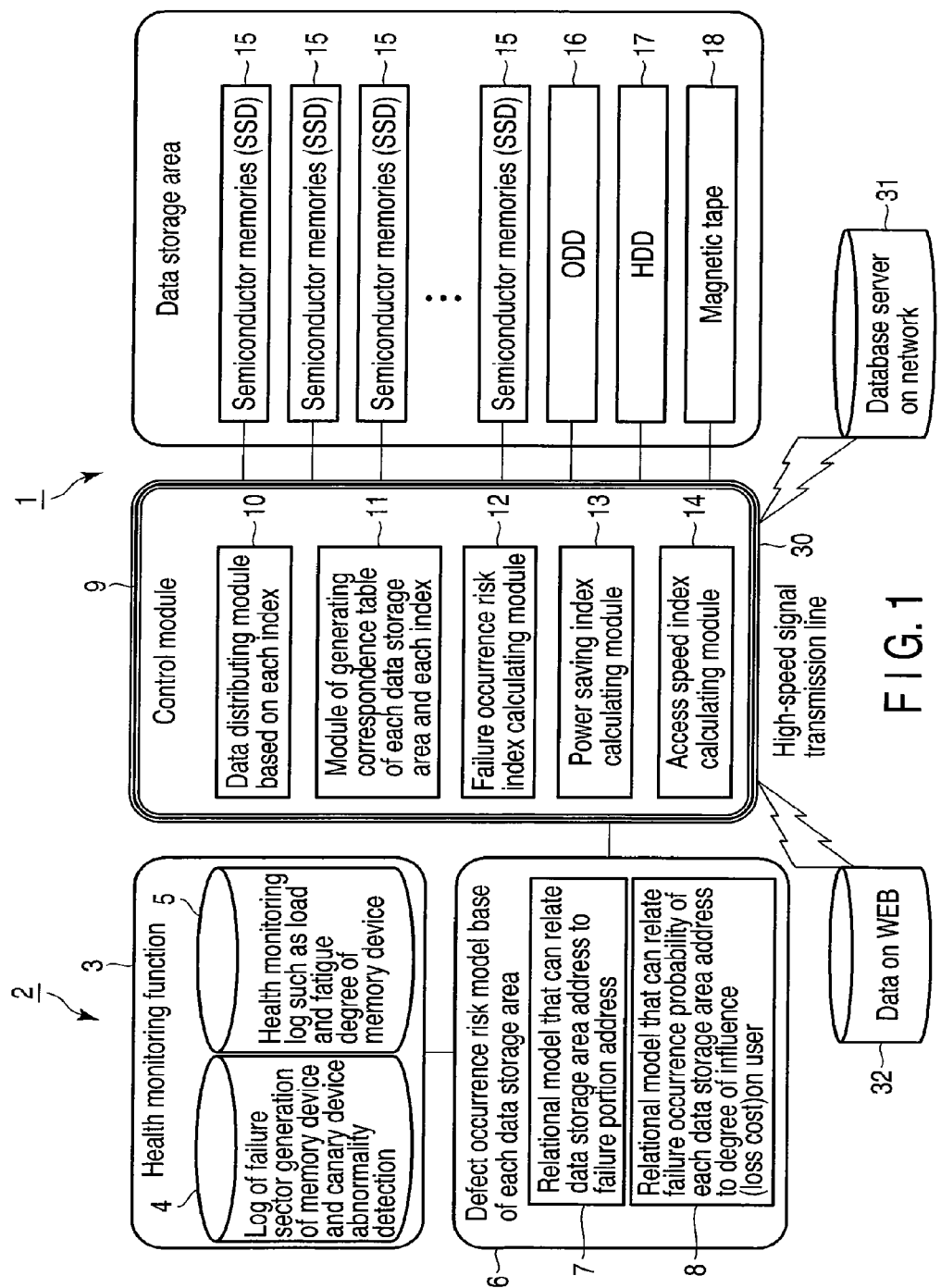
F I G. 1

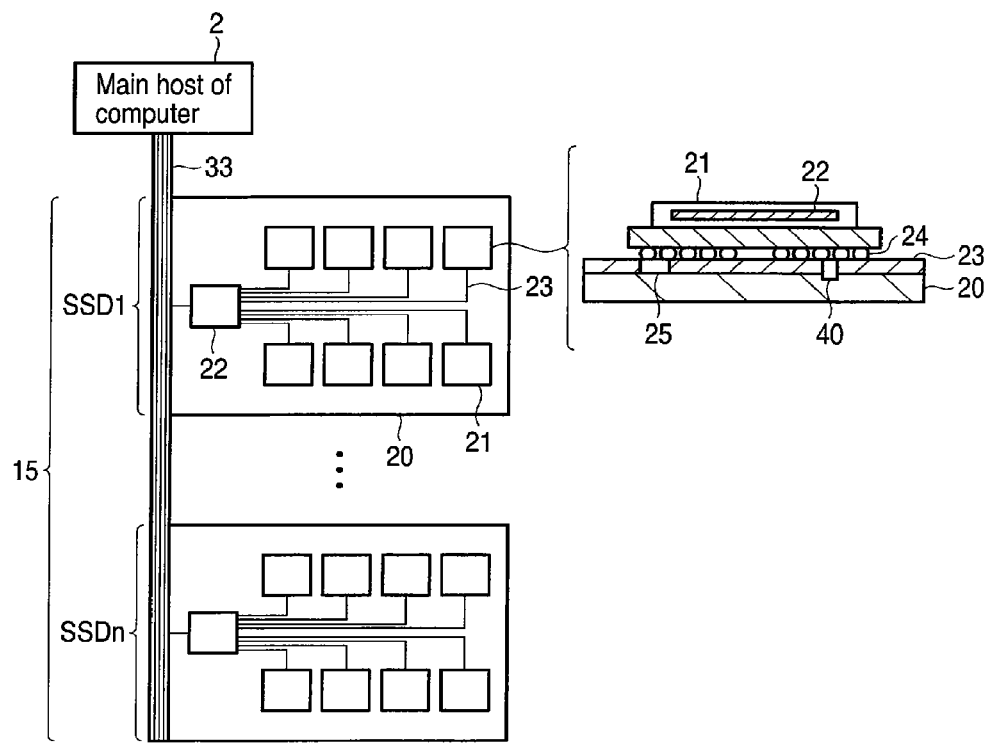
F I G. 2
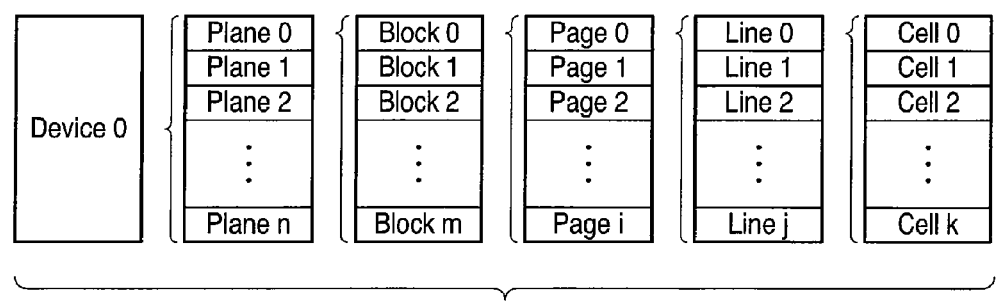
F I G. 3

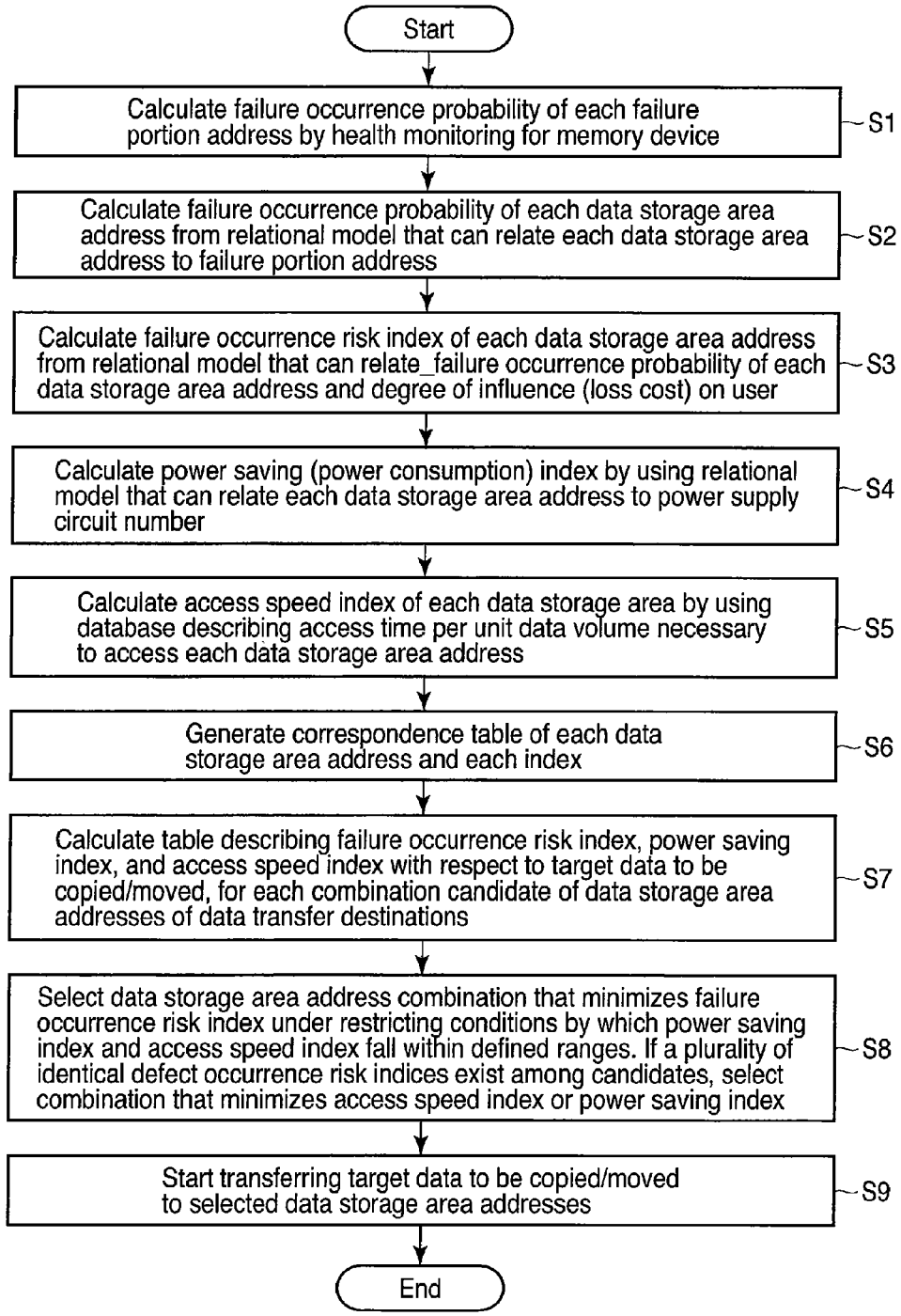
F I G. 4

| Failure portion address | Failure occurrence probability |
|---|---|
| Memory 1 cell 34 | 0.52 |
| Joint location m2-BGA46 | 0.21 |
| Interconnection C5 | 0.83 |
| ⋮ | ⋮ |
F I G. 5
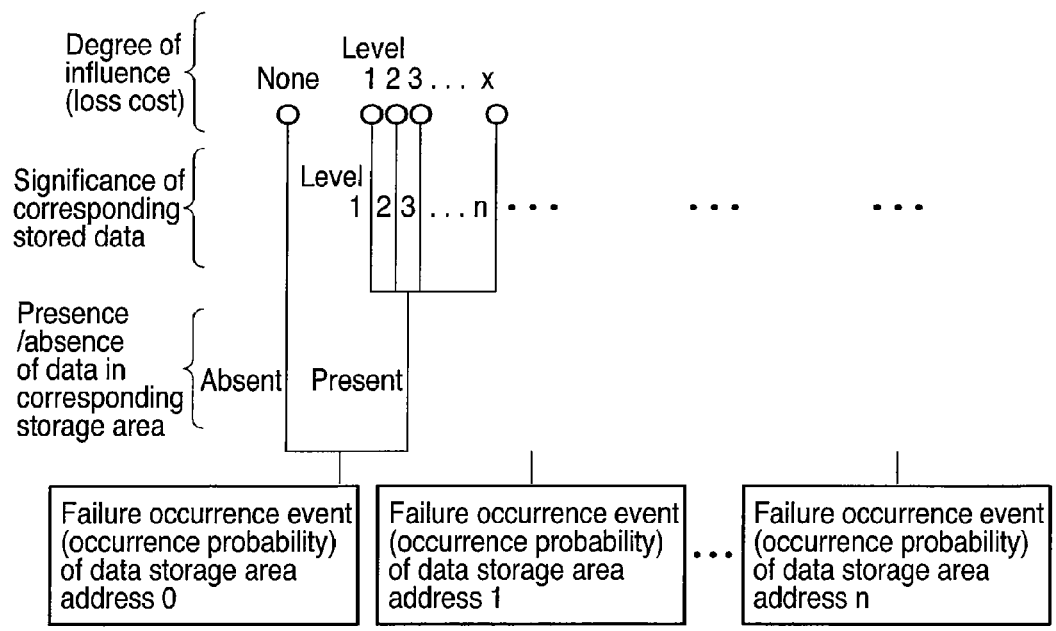
F I G. 7

| Data storage area address | Failure occurrence risk index | Power saving (power consumption) index | Access speed index |
|---|---|---|---|
| Data storage area address 1 | 5 | 1 | 2 |
| Data storage area address 2 | 2 | 3 | 2 |
| Data storage area address 3 | 0 | 2 | 4 |
| ⋮ | ⋮ | ⋮ | ⋮ |
| Data storage area address n | 8 | 6 | 2 |

FIG. 8

| Target file | Volume | Storage area address of data transfer destination | Failure occurrence risk index | Power saving index | Access speed index |
|---|---|---|---|---|---|
| File 1 | 3Mb | 1 | 1 | 2 | 1 |
| File 2 | 5Kb | 2 | 1 | 2 | 1 |
| File 3 | 2Gb | 3,4,5,6,7,8 | 1 | 2 | 3 |
| ⋮ | ⋮ | ⋮ | ⋮ | ⋮ | ⋮ |
| File N | 10Mb | 3,6,9 | 1 | 2 | 2 |

FIG. 9 ns between adjacent memory pages are not the only causes of data corruption in a memory device using a semiconductor memory such as a flash memory. For example, a plurality of flash memory packages and a control IC in a solid state drive are connected to a printed circuit board via a large number of solder joint locations, and these solder joint locations or interconnections may cause a fatigue crack owing to a temperature cycle or mechanical load.

MEMORY DEVICE

CROSS-REFERENCE TO RELATED APPLICATIONS

This application is a continuation of U.S. application Ser. No. 12/748,807 filed on Mar. 29, 2010 and now pending, which is based upon and claims the benefit of priority from prior Japanese Patent Application No. 2009-083345, filed Mar. 30, 2009, the entire contents of all of which are incorporated herein by reference.

BACKGROUND OF THE INVENTION

1. Field of the Invention

The present invention relates to a memory device that protects data or reduces data errors by using an index such as a failure occurrence risk.

2. Description of the Related Art

A flash memory is beginning to be used as a memory device as the nonvolatile semiconductor memory techniques advance. The insulation properties of a thin insulating film of a memory device deteriorates with time because the film is exposed to a severe voltage load and temperature change when writing or erasing data. A high electric field applied to an oxide during erase and programming changes the structure of the insulating film, and produces an electron trap failure in the oxide layer. The structural failure causes a leak of electric charge in a floating gate. A number of failures occur with time, and the oxide layer finally breaks. If the deterioration of the insulation properties of a tunnel oxide exceeds a threshold value, no data can be erased from or programmed in a memory cell. Therefore, to prolong the life limited by the deterioration of the insulation properties of a flash memory, a data management strategy called wear leveling is performed. A wear leveling algorithm evenly disperses an erase/program cycle in all data storage areas (memory cells/blocks/pages/planes). Wear leveling is adopted as a technique that prolongs the fault life caused by the deterioration of the insulation properties of a device (semiconductor memory) by thus dispersing the erase/program cycle in the entire device, thereby preventing a data hot spot (see, e.g., JP-A No. 2008-139927 (KOKAI)).

In a memory device such as a solid state drive (SSD) in which a plurality of semiconductor memory devices are mounted on a circuit board, however, not only the deterioration of a memory in a user's use log but also a fatigue crack in a solder joint location connecting the memory and board or in a substrate interconnection is also a main failure mode.

On the other hand, the electronic device health monitoring technique can calculate, either periodically or in real time, the failure occurrence probability or the remaining life with respect to a fatigue crack in a solder joint location or interconnection on a semiconductor packaging substrate, from a data aggregate obtainable from a sensor or monitoring tool embedded in an electronic device (see, e.g., JP-A No. 2008-241432 (KOKAI)).

A memory device such as a solid state drive (SSD) including a plurality of semiconductor memories (e.g., flash memories) is required to have high data write/read reliability, high power-saving properties, and a high speed. To achieve these requirements, a mechanism for protecting data and a mechanism for reducing data errors are necessary. Means for solving the problem of the deterioration of the insulation properties of a semiconductor memory and the problem of the interference between close memory pages already exist. However, the deterioration of the insulation properties and the

BRIEF SUMMARY OF THE INVENTION

A memory device includes a first module configured to calculate a failure occurrence risk index of each data storage area address; a second module configured to calculate a power saving index of each data storage area address; a third module configured to calculate an access speed index per unit data volume necessary to access each data storage area address; a fourth module configured to generate a distribution table that represents the failure occurrence risk index, the power saving index, and the access speed index for each candidate address, with respect to data to be distributed; and a fifth module configured to select a candidate address in the distribution table such that the power saving index and the access speed index meet restricting conditions and the failure occurrence risk index is minimized, and distribute the data to the candidate address.

BRIEF DESCRIPTION OF THE SEVERAL VIEWS OF THE DRAWING

FIG. 1 is a block diagram showing a memory device according to an embodiment;

FIG. 2 is a view showing an example of the hardware configuration of an SSD;

FIG. 3 is a view showing data storage area addresses in the memory device (memory device);

FIG. 4 is a flowchart showing a series of operation procedures by which the memory device according to this embodiment distributes data;

FIG. 5 is a view showing an example of a correspondence table of a failure portion address and failure occurrence probability;

FIG. 7 is a view showing an example of a relational model that can relate the failure occurrence probability of each data storage area address to the degree of influence (loss cost) on a user;

FIG. 8 is a view showing an example of a correspondence table of each data storage area address and each index; and FIG. 9 is a view showing an example of a distribution table.

DETAILED DESCRIPTION OF THE INVENTION

Figure 6:
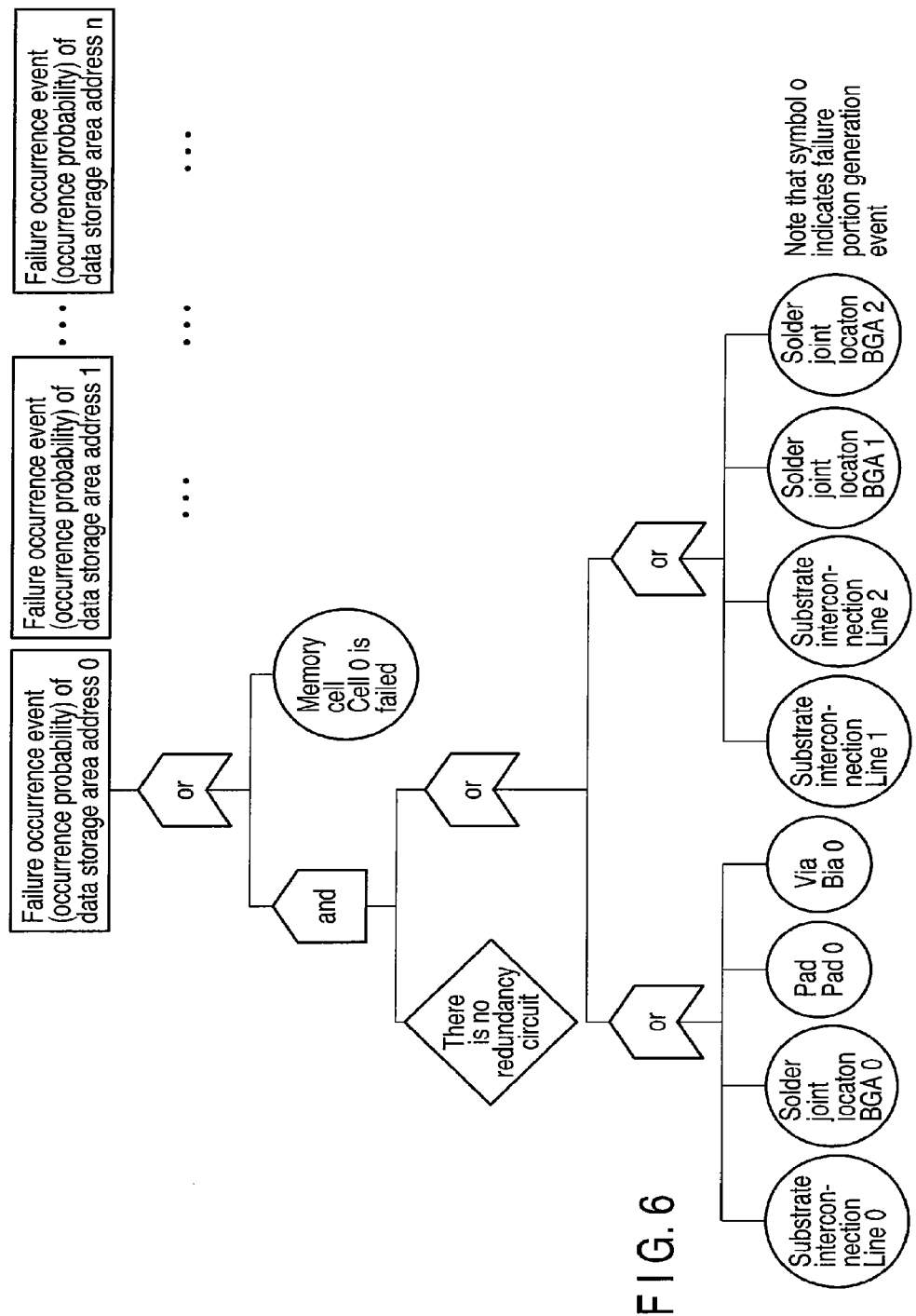
FIG. 6 is a view showing an example of a relational model that can relate the data storage area address to failure portion address.

Embodiments of the present invention will be explained below with reference to the accompanying drawing. In a memory device such as a solid state drive (SSD), It is favorable not only to cope with a failure sector generated in reality, but also to distribute data when transferring it by taking account of the generation risk of a failure sector (memory cell/block/page/plane) in the data transfer destination. This is to avoid a situation requiring an error correcting process in advance because, if a failure sector exists and a heavy measure using an error correction code is necessary, the processing requires an extra time and extra power consumption. Also, the failure sector generation risk is preferably calculated from the total system failure occurrence risk including not only a deterioration failure of a memory cell but also a fatigue crack in a joint location made of solder or the like or in an interconnection.

FIG. 1 is a block diagram showing a memory device according to an embodiment. A memory device 1 according to this embodiment is formed outside or inside the main body of an information processor 2.

The memory device 1 is a hybrid memory device having data storage areas of different kinds of storage media such as solid state drives (SSDs) 15 each including a plurality of semiconductor memories, an optical magnetic disk device (ODD) 16, a magnetic disk device (HDD) 17, and a magnetic tape 18. However, the memory device 1 is not limited to any specific configuration. For example, the memory device 1 may also include only one SSD 15. Alternatively, an on-line database server 31 connected to the information processor 2 across a network may also be used as a data storage area.

FIG. 2 is a view showing an example of the hardware configuration of the SSD 15. As shown in FIG. 2, a plurality of (in this example, eight) memory packages (semiconductor memories) 21 are arranged on an SSD substrate 20, and connected to a control IC 22 for controlling them. The control IC 22 is connected to a main host (the information processor 2) via a connector 33 and a high-speed signal transmission line 30 shown in FIG. 1.

Each memory package 21 incorporates a memory device 26. The memory device 26 is connected to a substrate interconnection (Line/Cell) 23 via solder joint locations (BGA) 24. A pad 25, via 40, and the like are formed in the substrate interconnection 23. As shown in FIG. 3, the data storage areas are hierarchically given addresses such as Device, Plane, Block, Page, Line, and Cell. These addresses are made to correspond to elements forming the hardware of the data storage areas. Also, the hardware portions such as the solder joint locations and substrate interconnections described above are given, e.g., numbers such as BGA 0, BGA 1, . . . , BGA n and Line 0, Line 1, . . . , Line n capable of specifying these hardware portions.

As shown in FIG. 1, the memory device 1 includes a control module 9 for controlling data transfer from the information processor 2 to the data storage areas. Data is transferred through the high-speed signal transmission line 30.

The control module 9 includes modules 10, 11, 12, 13, and 14. The module 10 distributes data to be transferred from the information processor 2 to the data storage areas, in accordance with a distribution table based on a failure occurrence risk index, power saving (power consumption) index, and access speed index. The module 11 generates a correspondence table of each data storage area and each index table. The modules 12, 13, and 14 respectively calculate the above-mentioned failure occurrence risk index, power saving (power consumption) index, and access speed index.

The calculated indices, correspondence table, distribution table, and the like are stored in a certain storage means usable by the control module 9. This storage means is, e.g., a dynamic RAM (DRAM) or static RAM (SRAM), and can be one of the data storage areas or an exclusive storage means.

Note that the control module 9 can be implemented by the information processor 2 (main host) that provides hardware and software resources such as a CPU and operating system (OS) for executing various programs, and can also be implemented by a host function independent of the main host. For example, the control module 9 can be implemented by one of the control ICs 22 contained in the plurality of SSDs 15. Alternatively, an exclusive control IC or CPU for implementing the control module 9 may also be installed.

When implementing the control module 9 as a main host function, processing executable before data distribution performed by the control module 9 is preferably executed as background processing of the main host or executed when the main host is not in use, so as not to degrade the original availability of the device.

The information processor 2 includes a health monitoring function 3 and log 4. The log 4 stores the log of failure storage areas (sectors) and the log of canary device abnormality detection, obtained by an abnormality detecting function and canary device function. The information processor 2 also includes a log 5. The log 5 stores the log of, e.g., the deterioration degree of a memory cell in the memory device 1, and the load and fatigue degree of package joint locations and substrate interconnecting portions. Note that the information processor 2 includes the health monitoring function 3 in this embodiment, but the memory device 1 may also include this function.

The information processor 2 further includes a failure occurrence risk model base 6 of each data storage area. The model base 6 includes, e.g., relational models 7 and 8. The relational model 7 represents the association of each data storage area address with a failure portion address. The relational model 8 represents the association of the failure occurrence probability of each data storage area with the degree of influence (loss cost) on a user. The model base 6 may also be given as data 32 on a WEB by, e.g., the manufacturer.

The control module 9 distributes each data of an aggregate of data to be transferred by write or read, based on at least one index selected from the failure occurrence risk of each data storage area, the power saving (power consumption), and the speed of access to each cell. For this purpose, the control module 9 includes a failure occurrence risk index calculating module 12, power saving (power consumption) index calculating module 13, and access speed index calculating module 14, as modules for calculating these indices. Data can be distributed based on only one of these indices. Note that when the power saving index calculating module 13 is installed, the device includes a power supply control module that divides a circuit for supplying electric power to each semiconductor memory into a plurality of regions, and can individually supply power to each divided region.

The data distributing module 10 based on these indices calculates a correspondence table that makes each index correspond to each data storage area address pertaining to a target data aggregate.

FIG. 4 is a flowchart showing a series of operation procedures by which the SSD memory device according to this embodiment distributes data.

(Step S1) The failure occurrence probability of each failure portion address is calculated by health monitoring for the memory device.

More specifically, the health monitoring function calculates the failure occurrence probability of each failure portion address from log data of a sensor such as a temperature sensor or a monitoring tool. This process updates and holds a correspondence table of the failure portion address and failure occurrence probability as shown in FIG. 5.

The meaning of the failure portion address is as follows. That is, a plurality of portions where a failure may occur in a target memory device are classified beforehand into regions such as a memory cell (Cell No. 1), a solder joint location (BGA 1), and an interconnecting portion of each region (e.g., the substrate interconnecting portion Line 1 connecting the solder joint location BGA 1 immediately below the lower right corner of memory package No. 1 and the solder joint location of control IC package No. 2). Each classified portion can be identified by only an address represented by a symbol, name, or numerical value. This address is the failure portion address.

Note that as a method of calculating the failure occurrence probability (failure occurrence risk index), a method described in Japanese Patent Application No. 2007-081687 pertaining to a load calculating device can also be used.

Note also that it is preferable to install a module that corrects the correspondence table or failure occurrence probability based on the failure symptom detection result of health monitoring.

(Step S2) The failure occurrence risk index calculating module 12 calculates the failure occurrence probability of each data storage area address from the relational model 7.

(Step S3) The failure occurrence risk index calculating module 12 calculates the failure occurrence risk index of each data storage area address from the relational model 8.

In steps S2 and S3 described above, the failure occurrence risk index calculating module 12 calculates the failure occurrence risk index for a data aggregate in all the data storage areas or a specific area, based on the correspondence table of the failure portion address and failure occurrence probability shown in FIG. 5, the relational model 7 shown in FIG. 6, and the relational model 8 of the failure occurrence probability of each data storage area address and the degree of influence (loss cost) on a user shown in FIG. 7, and updates and holds a correspondence table (not shown) of the data storage area address and failure occurrence risk index.

FIG. 6 shows details of the relational model 7. As shown in FIG. 6, the relational model 7 is a multi-input/multi-output function configured by logical operations such as AND and OR. This function expresses, by a fault tree or the like, an association diagram indicating which data storage area becomes unusable if a failure occurs at which failure portion address, based on data (e.g., a fault tree (FT) or event tree (ET)) of substrate interconnection CAD, semiconductor package CAD, and memory chip CAD. The logical operations can include Delay, Matrix, Quantification, Comparison, or a state transition diagram representing the probability state transition relationship between multiple states. This multi-input/multi-output function expressed by a Boolean logic diagram describes the casual relationship between the occurrence event of each failure portion and the system failure mode. When the failure occurrence probability of each failure portion address is input, the failure occurrence probability of each data storage area can be calculated from the relational model 7. Note that memory cell/block/page/plane means the data storage area address for data storage, and can be a memory cell having a single data storage area address, or memory cell/block/page/plane obtained by redefining a plurality of data storage area addresses by an address having another name.

Examples of the failure occurrence risk index are the failure occurrence probability of a portion where a failure may occur at that time, an expected value of the remaining life distribution at that time, an expected value of the loss cost calculated by multiplying the failure occurrence probability at that time by the loss cost when a failure occurs (an expected loss: the failure occurrence probability×the degree of influence when a failure occurs), and the availability. Note that as shown in FIG. 7, the loss cost changes in accordance with the presence/absence of data in the corresponding storage area or the significance.

(Step S4) The power saving (power consumption) index calculating module 13 calculates the power saving index by using a relational model that can relate each data storage area address to a power supply circuit number.

The relational model (not shown) of each data storage area address and the power supply circuit number is a multi-input/multi-output function expressing, by logical operations such as AND and OR, the association indicating which data storage area can be accessed with what power consumption when which power supply circuit number is turned on and which power supply circuit number is turned off. In this relational model that can relate each data storage area address to the power supply circuit number, 1 is input to a data storage area as an access target, and 0 is input to a data storage area that is not an access target. Consequently, the power supply circuit number to be turned on and the value of power consumption are output. This function is updated in accordance with the damage conditions at the failure portion address. The power saving (power consumption) index calculating module 13 sets, as the power saving index, the power consumption value output from the relational model that can relate each data storage area address to the power supply circuit number.

As described above, the power saving index is calculated as the power consumption required to copy/move data, by using, as functions, the volume of a target copy/move data aggregate to be copied/moved, and the state in which the power supply circuit is divided into each memory device as functions. That is, in accordance with the volume of a data aggregate to be moved/copied and the state in which the data storage areas are divided, the power consumption necessary to move or copy the data aggregate is calculated as the power saving index. When all data storage area addresses as the transfer destinations exist in the same memory device, the power can be saved by setting the power supply circuits so as to supply power to only this memory device.

(Step S5) The access speed index calculating module 14 calculates the access speed index for each data storage area by using a database describing the access time per unit data volume necessary to access each data storage area address.

The access speed index calculating module 14 is a function for calculating the time or speed for accessing a physical area of an actual memory chip when selecting a target data storage area. This function is updated in accordance with the damage conditions of a failure portion address.

More specifically, the access speed index is calculated based on the volume of data that can be copied/moved per unit time or the data copying/moving time per unit volume, by using the volume of a target data aggregate to be copied/moved and each storage area address of a transfer candidate as functions.

(Step S6) The table generating module 11 generates a correspondence table of each data storage area address and each index. FIG. 8 shows an example of this correspondence table.

(Step S7) The data distributing module 10 based on each index calculates a table (distribution table) describing the failure occurrence risk index, power saving index, and access speed index for each combination candidate of data storage area addresses in the data transfer destination, with respect to target data to be copied/moved. FIG. 9 shows an example of the distribution table.

(Step S8) A data storage area address combination that minimizes the failure occurrence risk index under the restricting conditions that the power saving index and access speed index fall within defined ranges. If a plurality of identical failure occurrence risk indices exist among candidates, a combination that minimizes the access speed index or power saving index is selected.

More specifically, the data distributing module 10 based on each index extracts, as a candidate, a data storage area address combination that minimizes the failure occurrence risk index, for a target file (a target to be copied/moved to the memory device) to be processed. In this step, values indicating the power saving index and the access speed index (or the failure occurrence risk index) of the data storage area address are obtained from the correspondence table obtained in step S6, and the extraction is performed such that the total value falls within a predetermined defined range (restricting condition).

(Step S9) The data distributing module 10 based on each index starts transferring the target data to be copied/moved to the selected data storage area addresses.

Note that the unit of the data distributing process can be any of a memory cell, memory block, memory page, memory plane, and memory device.

In the operation procedures explained above, data is distributed by using all of the failure occurrence risk index, power saving index, and access speed index. However, the distribution can also be performed by using only one of these indices.

When distributing data by using the failure occurrence risk index, it is possible to minimize the data erase risk of the data being saved, or minimize the error occurrence probability of the data being accessed (during data transfer or write).

When distributing data by using the power saving index, for a plurality of semiconductor memories to be accessed during data access to each semiconductor memory, electric power is supplied to only one of a plurality of power supply circuits, thereby maximally saving the power.

When distributing data by using the access speed index, it is possible to copy/move (transfer, write, or read) a target data aggregate at the highest speed.

To improve the total performance of data saving by referring to a plurality of indices, data can be distributed by using a function (e.g., a total sum) including the indices as variables. If tradeoff is a problem, it is possible to prepare a table or correlation model having correlation information of the indices in advance, and distribute data based on the correlation information so as to achieve Parato optimization.

In the embodiment explained above, in a memory device such as a solid state derive (SSD) using a plurality of semiconductor memories, data can be distributed by taking account of the generation risk of a failure sector in the transfer destination of the data, in order to protect the data or achieve the requirements for a high speed, high power saving, and high reliability of data write/read. The failure sector generation risk is calculated as a total system failure occurrence risk index including not only a deterioration failure of a memory cell but also a fatigue crack of a solder joint location or interconnection.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory device comprising:
 a first module configured to calculate a failure occurrence risk index of each data storage area address;
 a second module configured to generate a distribution table that represents the failure occurrence risk index for each candidate address, with respect to data to be distributed; and
 a third module configured to select a candidate address in the distribution table such that the failure occurrence risk index is minimized, and distribute the data to the candidate address,
 wherein the failure occurrence risk index is calculated by using:
 a table representing a failure occurrence probability of a failure portion address;
 a first model that associates a failure occurrence probability of each data storage area address with the failure portion address; and
 a second model that associates a degree of influence on a user with a failure occurrence probability of each data storage area address.

2. The device according to claim 1, further comprising a fourth module configured to monitor, by symptom detection of health monitoring, a failure occurrence condition including one of a failure sector generation log and a canary device abnormality sensing log, and update the table representing the failure occurrence probability of the failure portion address in accordance with the failure occurrence condition.

3. The device according to claim 1, wherein the data storage area is divided into a plurality of areas, power supply to each of the plurality of areas being individually controllable, and
 the device further comprises a fifth module which calculates, as the power saving index, power consumption necessary to move or copy a data aggregate to be moved or copied, in accordance with a volume of the data aggregate and a way the data storage area is divided.

* * * * *